(12) United States Patent
Kimura et al.

(10) Patent No.: US 8,567,306 B2
(45) Date of Patent: *Oct. 29, 2013

(54) FRYER

(75) Inventors: Takao Kimura, Tokyo (JP); Haruo Tanaka, Tokyo (JP); Koji Yamada, Kanagawa (JP)

(73) Assignee: Mermaid Co., Ltd., Tokyo (JP)

( * ) Notice: Subject to any disclaimer, the term of this patent is extended or adjusted under 35 U.S.C. 154(b) by 764 days.

This patent is subject to a terminal disclaimer.

(21) Appl. No.: 12/065,969

(22) PCT Filed: Apr. 3, 2007

(86) PCT No.: PCT/JP2007/057462
§ 371 (c)(1),
(2), (4) Date: Mar. 6, 2008

(87) PCT Pub. No.: WO2007/116882
PCT Pub. Date: Oct. 18, 2007

(65) Prior Publication Data
US 2009/0101023 A1   Apr. 23, 2009

(30) Foreign Application Priority Data

Apr. 3, 2006 (JP) ................................. 2006-102570
Apr. 3, 2006 (JP) ................................. 2006-102572
Aug. 31, 2006 (JP) ................................. 2006-235980
Feb. 20, 2007 (JP) ................................. 2007-039877

(51) Int. Cl.
*A47J 37/12* (2006.01)

(52) U.S. Cl.
USPC .............. 99/408; 99/403; 99/407; 426/330.6; 210/175; 210/512.1; 210/532.1; 210/800; 219/439; 392/442; 126/387.1; 261/36.1

(58) Field of Classification Search
USPC ......... 99/403–405, 407, 408; 426/330.6, 417, 426/431; 210/86, 175, 182, 188, 257.1, 210/259, 418, 452, 512.1, 513, 532.1, 534, 210/744, 767, 774, 800, 801, 804; 219/430, 219/439, 494, 496, 497; 392/442, 447, 448, 392/449, 451, 453, 458, 461; 126/391.1, 126/376.1, 387.1; 261/36.1, 65
See application file for complete search history.

(56) References Cited

U.S. PATENT DOCUMENTS 2,354,675 A * 8/1944 Fisher ............................ 96/232
3,356,218 A * 12/1967 Grudoski ................. 210/167.28
(Continued)

FOREIGN PATENT DOCUMENTS

EP   1797802   *   6/2007
EP   1797802 A1   6/2007
(Continued)

OTHER PUBLICATIONS

International Search Report of PCT/JP2007/057462, date of mailing Jul. 10, 2007.

*Primary Examiner* — Yuwen Pan
*Assistant Examiner* — Mark Woodall
(74) *Attorney, Agent, or Firm* — Westerman, Hattori, Daniels & Adrian, LLP

(57) ABSTRACT

A fryer is provided which, during a standby for cooking, can keep the temperature of a cooking oil slightly lower than a cooking temperature and, during cooking, can quickly raise the oil temperature to the cooking temperature. The fryer also has capabilities of easily performing a heat exchange operation on the cooking oil, preventing degradation of the cooking oil, securing a good kitchen environment and enhancing a work efficiency. The fryer comprises a fryer tank having oil and water for cleaning the oil stored in two layers one upon the other; and a heater installed in the oil layer; wherein the water in the water layer is drawn out from a water suction opening at a bottom of fryer tank, cleaned by a filtering water tank and then delivered into the fryer tank almost horizontally in an off-centered direction from a water supply opening formed in a lower, side wall of the fryer tank, thus rotating the water in the fryer tank in a swirl. The fryer also has a device for discharging impurities collected in the filtering water tank.

4 Claims, 9 Drawing Sheets

(56) References Cited

U.S. PATENT DOCUMENTS

| | | | |
|---|---|---|---|
| 3,976,574 A * | 8/1976 | White | 210/188 |
| 4,068,014 A * | 1/1978 | Heimbruch | 426/582 |
| 4,750,843 A * | 6/1988 | Endtner et al. | 366/165.3 |
| 4,880,652 A * | 11/1989 | Regutti | 426/417 |
| 5,055,198 A * | 10/1991 | Shettigar | 210/650 |
| 5,470,459 A * | 11/1995 | Barrington et al. | 210/149 |
| 5,487,907 A * | 1/1996 | Drown et al. | 426/417 |
| 5,632,266 A * | 5/1997 | Sato | 126/391.1 |
| 6,322,694 B1 * | 11/2001 | Iliadis et al. | 210/167.01 |
| 6,363,840 B1 * | 4/2002 | Song | 99/408 |
| 6,558,554 B1 * | 5/2003 | Jones et al. | 210/739 |
| 7,703,388 B2 * | 4/2010 | Usui et al. | 99/408 |
| 2005/0003041 A1 * | 1/2005 | Kamil | 426/16 |
| 2010/0116148 A1 * | 5/2010 | Usui et al. | 99/408 |

FOREIGN PATENT DOCUMENTS

| | | | |
|---|---|---|---|
| JP | 53-6468 A | | 1/1978 |
| JP | 62-189032 U | | 12/1987 |
| JP | 4-341222 A | | 11/1992 |
| JP | 2001-321274 A | | 11/2001 |
| JP | 2001321274 A | | 11/2001 |
| JP | 2002-291623 A | | 10/2002 |
| WO | 2006/038677 A1 | | 4/2006 |
| WO | 2006-038677 A1 | | 4/2006 |
| WO | WO 2006/038677 | * | 4/2006 |

* cited by examiner

FRYER

TECHNICAL FIELD

The present invention relates to a fryer capable of automatically removing deep-fried batter balls and automatically cleaning cooking oil to keep the cooking oil clean, prevent its degradation and thereby extend its useful life.

BACKGROUND ART

Some conventional fryers have water and cooking oil stored in a fryer tank in two layers in contact with each other at their boundary, with the water lying at the bottom of the fryer tank and with a heater installed in the oil layer to heat the oil to a predetermined temperature (patent documents 1-3).

In such fryers, during the frying process, minute batter balls dispersing from food ingredients into the cooking oil, colloidal materials drifting away from the food being fried, and water flowing out of the food material (these are hereinafter referred to as impurities) are allowed to sink freely to the bottom of the fryer tank so as to minimize degradation and darkening of oil caused by these impurities.

In other types of fryers, an impurity removing device is provided separate from the fryer and installed in the fryer tank, which has an oil layer and a water layer, to remove impurities such as deep-fried batter balls from the cooking oil by circulating with a pump the oil between the fryer and the impurity removing device (patent document 4).

Patent document 1: Japanese Utility Model Disclosure No. 05-68440
Patent document 2: Japanese Patent Publication No. 55-40249
Patent document 3: Japanese Utility Model Disclosure No. 60-09426
Patent document 4: Japanese Utility Model Publication No. 56-11860

[Problems with Conventional Fryer]

In such a conventional fryer, to prevent a temperature of the cooking oil from falling during cooking and to enable it to return to the set temperature in a short time, the heater disposed in the oil layer is operated at a temperature higher than the cooking temperature of the oil. The oil in contact with the surface of the heater in particular is exposed to a far higher temperature than the set temperature.

Further, since a temperature band of the cooking oil for frying coincides with a temperature band that accelerates degradation and oxidation of the oil, the cooking oil gets easily degraded or oxidized during standby or during cooking. This in turn increases generation of smoke and evaporation, polluting the environment and rapidly changing the composition of the cooking oil.

Thus, there has been a demand for a device that, during standby, can keep the cooking oil at a somewhat lower temperature than that for cooking and, during cooking, quickly raise the oil temperature to the cooking temperature to make it ready for cooking and thereby minimize a quality degradation of the cooking oil.

In such a conventional fryer, if any bubble exists in an oil or water layer and comes into contact with the heated oil, the air bubble will expand explosively, scattering the hot oil.

Thus the bubble in the water or oil layer needs to be eliminated. However, no such device capable of eliminating air bubbles has been available and a fryer with such a function has been called for.

Furthermore, in such a conventional fryer, to remove impurities accumulated in the water layer, it is necessary to open a cock provided below the water layer to drain the water and then fill clean water into the water layer, refreshing the water layer with a predetermined amount of clean water.

Further, in the case of a fryer equipped with a filtering water tank in addition to the fryer tank and using a circulation filtering method, to remove impurities accumulated in the filtering water tank requires manually removing the impurities and cleaning the filtering water tank while not cooking. This takes time, prolonging the cooking interruption time, resulting in a reduced cooking efficiency.

For this reason, there has been a call for a fryer with the filtering water tank that allows easy removal of impurities in the filtering water tank.

DISCLOSURE OF THE INVENTION

The present invention has been accomplished with a view to overcoming the problems experienced with the conventional technologies. A technical task to be achieved in solving the above-mentioned problems is to provide a fryer that can easily perform a cooking oil heat exchange so as to keep the temperature of a cooking oil slightly lower than a cooking temperature during standby and which, during cooking, can quickly raise the oil temperature to the cooking temperature, thereby preventing degradation of the cooking oil, securing a good culinary environment, enhancing a work efficiency, reducing an economic burden, and minimizing environmental pollutions.

It is also our technical task to provide a fryer with a function of eliminating bubbles in water or oil.

Another technical task is to provide a fryer with a filtering water tank which can easily remove impurities in the filtering water tank.

The present invention has many aspects for effectively solving the problems experienced with the conventional technologies.

Viewed from a first aspect, the present invention provides a fryer comprising: a fryer tank having oil for cooking and water for purifying the oil, the oil and the water being vertically arranged in two layers one upon the other; and a heater disposed in the oil layer; wherein a water layer in the fryer tank or a part of an oil layer beneath the heater is horizontally rotated in a swirl.

A second aspect of the present invention provides a fryer further including a water level sensor arranged to vertically span a boundary between the oil and water layers in the fryer tank to monitor a change in water level.

A third aspect of the present invention provides a fryer, wherein water in the water layer is drawn out from a water suction opening at a bottom of the fryer tank and then delivered into the fryer tank almost horizontally in an off-centered direction from a water supply opening formed in a side wall of the fryer tank and opening to the water layer or to a part of the oil layer beneath the heater, thus rotating the water layer in the fryer tank or the part of the oil layer beneath the heater in a swirl.

A fourth aspect of the present invention provides a fryer, wherein water in the water layer is drawn into a water-immersed pump installed near a side wall of the fryer tank in the water layer and delivered from the pump almost horizontally to rotate the water in the tank in a swirl.

A fifth aspect of the present invention provides a fryer, wherein oil in the oil layer is drawn out of the fryer tank by an oil pump installed outside the fryer tank and then delivered into the fryer tank almost horizontally in an off-centered direction from an oil supply opening formed in a side wall of the fryer tank and opening to the water layer or to a part of the oil layer beneath the heater, thus rotating the water layer or the part of the oil layer beneath the heater in a swirl.

A sixth aspect of the present invention provides a fryer, wherein oil in the oil layer is drawn into an oil-immersed pump installed near a side wall of the fryer tank beneath the heater and delivered from the pump almost horizontally to rotate the oil layer in a swirl.

A seventh aspect of the present invention provides a fryer, further including a filtering water tank installed close to the fryer tank and having a filter; wherein water in the water layer mixed with impurities, such as deep-fried batter balls, is drawn out from a water suction opening at a bottom of the fryer tank and then delivered into the filtering water tank where the impurities, such as deep-fried batter balls, are filtered out and allowed to settle on a bottom of the filtering water tank; wherein the filtered water is delivered into the fryer tank almost horizontally along a side wall of the fryer tank from a water supply opening formed in the side wall of the fryer tank and opening to the water layer or to a part of the oil layer beneath the heater.

An eighth aspect of the present invention provides a fryer, further including a bubble elimination tank installed in a water path running from the filtering water tank to the water layer or oil layer; wherein the bubble elimination tank separates water and air by accommodating water and accumulating it in a lower part thereof and air in an upper part thereof; wherein the bubble elimination tank has an inner pressure adjusting means at an upper end portion thereof to vent the air accumulated in the upper part of the bubble elimination tank to the outside.

A ninth aspect of the present invention provides a fryer, further including: an oil pump to draw oil from the oil layer and deliver it into the water layer or a part of the oil layer beneath the heater; a gas accumulator formed above the oil pump to hold a vaporized gas accumulated in the oil pump; and a pressure adjusting exhaust means to vent the vaporized gas from the gas accumulator to the outside.

A tenth aspect of the present invention provides a fryer comprising: a fryer tank to store an oil layer for cooking and a water layer into which impurities such as deep-fried batter balls in the oil layer sink, the oil layer and the water layer being vertically arranged in two layers one upon the other; a heater installed in the oil layer; and a filtering water tank to receive water from the water layer, filter out impurities mixed in the water by a filter and return the filtered water to the fryer tank; wherein the filtering water tank has an impurity removing device that is connected with a water discharge path and a water supply path; wherein the water discharge path has a stop valve and discharges the water mixed with the impurities from an untreated water reservoir upstream of the filter to the outside of the filtering water tank; wherein the water supply path has a flow regulator and, during a water discharging operation, supplies water to the untreated water reservoir upstream of the filter or to a clean water reservoir downstream of the filter.

An eleventh aspect of the present invention provides a fryer, wherein the impurity removing device has connected to a bottom of the filtering water tank the water discharge path that discharges water containing impurities from the untreated water reservoir upstream of the filter to the outside of the filtering water tank.

A twelfth aspect of the present invention provides a fryer, wherein the impurity removing device has an impurity collecting container that accommodates impurity-laden water, discharged from the discharge opening of the water discharge path, through a net basket formed of a filtering material having almost the same mesh size as the filter of the filtering water tank.

A thirteenth aspect of the present invention provides an impurity removing method for a fryer, comprising the steps of: storing cooking oil and water in two layers one upon the other, the water being adapted to receive impurities sinking from the oil into it; filtering out impurities contained in water drawn from a water layer in a fryer tank into a filtering water tank; and returning the filtered water to the fryer tank; wherein, after stopping a circulation of the filtered water between the fryer tank and the filtering water tank, a water discharge path connected to an untreated water reservoir upstream of the filter in the filtering water tank and a water supply path connected to the untreated water reservoir upstream of the filter or a clean water reservoir downstream of the filter are opened to discharge impurities from the filtering water tank through the water discharge path, along with running water from the water supply path.

In the first aspect, the water layer in the fryer tank or a part of the oil layer beneath the heater is horizontally rotated in a swirl to cause the whole oil layer to rotate horizontally by its viscosity, increasing the contact between the oil and the heater disposed in the oil layer and therefore the volume of heat exchanged.

During a standby, it is possible to keep the cooking oil at a low temperature at which the oil is not easily deteriorated. During cooking, the part of the oil layer situated above the heater can be quickly raised to the cooking temperature, thus shortening the time it takes to return the oil temperature to the cooking temperature and effectively pre-venting oil degradations.

At the boundary between oil and water, the oil is stirred by the water causing minute impurities mixed in the oil, such as deep-fried batter balls, to fall into the water, thus clearing the oil of impurities. In this way, impurities contained in the oil, such as liquids and smell components coming out of food materials, can be removed from the oil layer.

With the second aspect, it is possible to prevent an overflow of cooking oil that would otherwise be caused by water from food materials or melted water from frozen food raising the volume and level of water. It is also possible to monitor an appropriate water level for frying at all times. The second aspect therefore enables the water level to be kept within an appropriate, allowable range.

With the third to sixth aspect, the effect described in the first aspect can be reliably achieved by rotating the water layer or a part of the oil layer beneath the heater in a large swirl to directly or indirectly rotate the oil layer.

With the seventh aspect, the filtering water tank filters out impurities contained in water of the water layer and returns the filtered water through the filtered water path to the water layer in the fryer tank, thus circulating the water between the water layer in the fryer tank and the filtering water tank, which in turn keeps the water in the fryer tank clean at all times.

The seventh aspect, therefore, can more advantageously realize the effect described in the first aspect.

With the eighth aspect, the bubble elimination tank separates water and air. When the pressure of the air accumulated in the upper part of the bubble elimination tank exceeds a predetermined pressure, it can be vented through the inner pressure adjusting means incorporating a pressure adjust valve. Thus the water in the fryer tank can be cleared of bubble at all times.

This in turn prevents an accident of bubble explosion that would occur when the bubble comes into contact with hot oil during cooking, thus securing safety and preventing possible environmental contamination.

With the ninth aspect, vaporized gas accumulated in the upper part of the oil pump in an oil circulation path—that draws oil by suction from the fryer tank and, after the oil temperature is lowered, returns it to the fryer tank—can be vented through the gas accumulator. When the gas pressure exceeds a predetermined pressure, it can be vented through the pressure adjusting exhaust means incorporating a pressure adjust valve. This in turn prevents an accident of bubble explosion that would occur when the bubble comes into contact with hot oil, thus securing safety and preventing possible environmental contamination.

The impurity removing device as the tenth aspect of this invention stops water circulation between the water layer in the fryer tank and the filtering water tank, as required, supplies water from the water supply path to the untreated water reservoir upstream of the filter in the filtering water tank or to the clean water reservoir downstream of the filter, and discharges water from the untreated water reservoir upstream of the filter in the filtering water tank through the water discharge path to the outside. This causes impurities accumulated in the filtering water tank, such as deep-fried batter balls, to be washed away to the outside, realizing the impurity removal and the washing of the filtering water tank without removing the filtering water tank.

At this time, when water is supplied from the water supply path to the clean water reservoir downstream of the filter, impurities clogging the filter, such as deep-fried batter balls, can be washed away along with impurities accumulated upstream of the filter.

In the eleventh aspect, the impurity removing device has connected to a bottom of the filtering water tank the water discharge path that discharges impurity-laden water from the upstream side of the filter to the outside of the filtering water tank. This allows impurities in the filtering water tank to be discharged from the water discharge path to the outside, thus realizing the removal of impurities and the washing of the filtering water tank without removing the filtering water tank.

In the twelfth aspect, as a container to receive impurity-laden water discharged from the filtering water tank, an impurity collecting container is provided which has a net basket formed of a filtering material having almost the same mesh size as the filter of the filtering water tank. The net basket traps and separates impurities, such as deep-fried batter balls, from water. Thus, the impurities can be discarded as raw combustible waste and water as effluent.

The thirteenth aspect provides the impurity removing method, which, after stopping a circulation of the filtered water between the fryer tank and the filtering water tank, opens the water discharge path connected to the untreated water reservoir upstream of the filter in the filtering water tank and the water supply path connected to the untreated water reservoir upstream of the filter or to a clean water reservoir downstream of the filter, in order to discharge impurities from the filtering water tank through the water discharge path, along with running water from the water supply path and clean the filtering water tank, without detaching the filtering water tank.

BEST MODE FOR CARRYING OUT THE INVENTION

Now, embodiments of the present invention will be described.

[Construction]

The fryer 1 as one embodiment of this invention has a fryer tank 1a shaped like a downwardly protruding pyramid or circular cone, as shown in FIG. 1 and FIG. 4C. The fryer tank 1a has two layers vertically disposed one upon the other—an oil layer 11 for cooking and a water layer 12 disposed beneath the oil layer 11 to receive impurities from the oil layer, such as deep-fried batter balls, to clean the cooking oil.

As shown in FIG. 1 and FIG. 3, an electric or gas heater 5 to heat the oil is provided in the oil layer 11 of the fryer tank 1a.

The heater 5 is located at an almost central part of the oil layer 11. With the heater 5 activated, two layers are formed—a high-temperature oil portion 11b and a low-temperature oil portion 11a—with their boundary slightly below the heater 5.

Thus, the fryer tank 1a has three layers which are, from the bottom upward, the water layer 12, the low-temperature oil portion 11a and the high-temperature oil portion 11b.

Of these, the high-temperature oil portion 11b constitutes a frying portion that fries at an appropriate temperature food materials with coatings that are put on a basket made of slender metal bars or metal grids and then lowered into the cooking oil.

The low-temperature oil portion 11a forms a temperature buffer portion between the high-temperature oil portion 11b and the water layer 12 and has a function of adjusting the oil temperature of the high-temperature oil portion 11b and supplying new oil that is not yet degraded.

The water layer 12 constitutes an impurity accumulator that functions as a sedimentation layer in which impurities produced during frying, such as fried batter balls, slowly settle. The water layer 12 also has a function of turning the water horizontally for oil cleaning and temperature adjustment.

The water in the water layer 12, as shown in FIG. 1, FIG. 4 and FIG. 7, is drawn out from a water suction opening 2b at the bottom of the fryer tank 1a by a water pump 2e along with impurities such as deep-fried batter balls and then flows through a pipe 2c of a water circulation path 2 into a filtering water tank 2a where it is filtered of impurities, such as deep-fried batter balls, by a filter 2j installed in the filtering water tank 2a. After being removed of impurities, the clean water is returned from a clean water reservoir 2m of the filtering water tank 2a into the fryer tank 1a.

When it is returned to the fryer tank 1a, the clean water is delivered from a water supply opening 2i in a side wall 1d on the back side of the fryer tank 1a almost horizontally along an adjoining side wall 1e so that the water moves in a swirl in the water layer 12 within the fryer tank 1a.

As the water layer 12 swirls, the low-temperature oil portion 11a disposed immediately above, and in contact with, the water layer 12 begins to turn with a time lag, causing the high-temperature oil portion 11b immediately above the low-temperature oil portion 11a also to move in a swirl with a greater time lag.

At this time, if ejected with a strong force, the water can fiercely stir the low-temperature oil portion 11a, prompting even fine pieces of impurities, such as deep-fried batter balls, contained in the oil to fall into the water, thus cleaning the oil.

Even in the above process, the stirring motion of a lower part of the low-temperature oil portion 11a does not affect its upper part, allowing it to turn in a relatively calm state as it is heated by the heater 5.

Turning the water in the water layer 12 as described above may also be achieved by installing a water-immersed pump 2p in the water layer 12, as shown in FIG. 7, to directly turn the water layer 12 and rotate the low-temperature oil portion 11a by the rotating force of the water.

It is also possible to install an oil pump (not shown), similar to the one shown in FIG. 7, in the oil layer 11 to directly turn the low-temperature oil portion 11a.

Another method of directly rotating the low-temperature oil portion 11a in a swirl involves discharging the clean water delivered from the filtering water tank 2a almost horizontally in an off-centered direction from the water supply opening 2i provided in the low-temperature oil portion 11a.

On an inner wall of the fryer tank 1a, there is provided a water level sensor 1c at a boundary position between the water layer 12 and the low-temperature oil portion 11a, as shown in FIG. 4C, to monitor the boundary between oil and water. An alarm lamp and a buzzer are activated to indicate when the water level is too high or too low.

The filtering water tank 2a has installed therein a vertically disposed stainless steel filter 2j of 0.7 mm mesh that divides the interior of the filtering water tank 2a. After having been drawn out of the fryer tank 1a by the water pump 2e into an untreated water reservoir 2k of the filtering water tank 2a upstream of the filter 2j, the water passes through the filter 2j onto the clean water reservoir 2m side, leaving the trapped impurities, such as deep-fried batter balls, in the untreated water reservoir 2k to settle on the bottom.

The water cleaned by the filtering water tank 2a is drawn by suction from a suction port 2f of the filtering water tank 2a into a bubble elimination tank 2g where bubbles are allowed to float upward. The water removed of bubbles flows out from an outlet port 2h of the bubble elimination tank 2g into the fryer tank 1a through the water supply opening 2i provided at the top of the water layer 12 or in the low-temperature oil portion 11a. In this way the water circulates in the water circulation path 2.

The fryer of this embodiment has an oil circulation path 3. The oil circulation path 3, as shown in FIG. 5, comprises a square-cylindrical flow path 3a of metal sheet mounted to an outer wall of the fryer tank 1a, a circular cylindrical pipe 3c, an oil discharge nozzle 3e and an oil pump 3b.

The square-cylindrical flow path 3a attached to the fryer tank 1a has an oil suction opening 3f formed at the upper end thereof and an opening 3g at the lower end thereof so that oil near the upper surface of the high-temperature oil portion 11b can be drawn into the oil suction opening 3f to let impurities such as deep-fried batter balls fall into the water layer 12 through the opening 3g at the lower end of the square-cylindrical flow path 3a.

The circular cylindrical pipe 3c is connected to an intermediate part of the square-cylindrical flow path 3a to allow the oil drawn in by the oil pump 3b to be delivered into the water layer 12 through the oil discharge nozzle 3e. The square-cylindrical flow path 3a has many fins 3d protruding from an outer surface thereof which are forcibly cooled by a wind from a cooling fan 4 to quickly cool the oil passing through the interior of the square-cylindrical flow path 3a from about 170° C. down to about 70-80° C.

The oil discharge nozzle 3e, as shown in FIG. 6, is laid longitudinally horizontally in the lower end part of the water layer 12 and has many small holes 3h formed in an upper surface of the front end thereof so that oil is broken into small pieces as it passes through them, floating upward in small balls or in continuous long bars.

The oil discharge nozzle 3e also has an oil release member 3i, semicircular in cross section, open on the underside and closed at its front end, to let impurities such as deep-fried batter balls contained in the oil fall downward.

As shown in FIG. 4, the bubble elimination tank 2g is connected at its upper end with an air vent pipe 7a through a water-side exhaust pipe joint 7f. A gas accumulator 3j formed above the oil pump 3b is connected at its upper end with a pipe 7b through a gas venting pressure adjust means 7g.

The air vent pipe 7a and the pipe 7b are joined by a merge joint 7c. The merge joint 7c is connected at its downstream side with a merge pipe 7d which has at its front end an inner pressure adjust joint 7e as a gas venting pressure adjust means. The inner pressure adjust joint 7e is connected to an upper end of the square-cylindrical flow path 3a to release the air accumulated in the upper part of the bubble elimination tank 2g and vaporized gas in the gas accumulator 3j above the oil pump 3b. All these combine to form an air venting path 7 that performs a pressure adjustment so that the pressure of air in the upper part of the bubble elimination tank 2g is almost equal to that of the gas accumulator 3j provided on the oil pump 3b side.

With the above construction, the amount of air accumulated in the upper part of the bubble elimination tank 2g and the amount of vaporized gas accumulated in the gas accumulator 3j at the upper end of the oil pump 3b are both kept minimal, preventing the air and vaporized gas from mixing in the high-temperature oil portion 11b during the circulation of water and oil, which in turn can avoid hot oil splashing accidents caused by sudden expansion of air or vaporized gas.

In the fryer of this embodiment constructed as described above, during a standby when food is not fried, the cooking oil is kept slightly lower (at a standby temperature) than a frying temperature. If, for example, food is to be fried at a set temperature of 170° C., the oil is kept at a slightly lower temperature of approximately 150° C. as a standby temperature.

When a user presses a switch 1g on a front panel 1f of the device to enter into the frying operation, the temperature of the heater 5 rises causing the oil temperature to start rising from the standby temperature to a set temperature (e.g., 170° C.). Since the heater 5 is disposed in the high-temperature oil portion 11b, only the high-temperature oil portion 11b is raised to the set temperature. In the low-temperature oil portion 11a, a relatively high temperature oil moves up to combine with the oil of the high-temperature oil portion 11b and a relatively low temperature oil moves down to combine with a low temperature oil. So there are always two layers—the high-temperature oil portion 11b and the low-temperature oil portion 11a—and the water layer 12 in contact with the low-temperature oil portion 11a is not heated while at the same time the high-temperature oil portion 11b can maintain the set temperature for frying.

At this time, the water in the water layer 12 may be set in rotating motion to change the heating mode from a natural convection heat transmission to a forced convection heat transmission to enhance the heat exchange performance of the heater 5, allowing the oil to better follow the rising temperature of the heater up to the set temperature and thereby quickly return from the standby state to the fry-ready state.

This shortens the time it takes for the oil to rise to the frying temperature and improves the oil's temperature response to the heater temperature rise, allowing the heater's target temperature to be set low and preventing oil degradation even if the oil is used repetitively.

When food materials are thrown into the high-temperature oil portion 11b, a normal frying operation is executed, producing a large amount of deep-fried batter balls. When large deep-fried batter balls are produced, they quickly sink, passing through the low-temperature oil portion 11a into the water layer 12. Then they are drawn by the water pump 2e along with water into the water circulation path 2 and then delivered to the filtering water tank 2a, where the deep-fried batter balls are trapped by the filter and the filtered water is returned to the water layer 12.

On the other hand, minute deep-fried batter balls are drawn into the square-cylindrical flow path 3a from its upper end, together with the oil in the upper part of the high-temperature oil portion 11b. In the square-cylindrical flow path 3a, the minute deep-fried batter balls and hot oil are forcibly cooled to a lower temperature. The deep-fried batter balls are allowed to fall into the water layer 12 from the opening 3g at the lower end of the square-cylindrical flow path 3a. The oil cooled to a lower temperature is delivered by the oil pump 3b through the circular cylindrical pipe 3c to the water layer 12. The oil is then broken into small pieces as it passes through the oil release member 3i of the oil discharge nozzle 3e, before being released into the water layer 12. When the oil in the form of small balls or continuous elongate bars comes into contact with water and gets cooled, fine impurities such as deep-fried batter balls are easily separated from the oil. The small pieces of oil then move up the water, leaving behind the impurities, until they reach and merge into the low-temperature oil portion 11a thus maintaining a required volume of clean oil.

As described above, the water circulation effectively filters out the deep-fried batter balls and the generation of a large swirl in the water layer 12 causes the oil in contact with the water to revolve, allowing the oil heated at the surface of the heater to efficiently transmit heat to the entire oil in the oil layer 11, thus stabilizing the oil temperature and reducing the time it takes for the oil to raise its temperature and return from the standby state.

[Impurity Removing Device]

The fryer of this embodiment has an impurity removing device 25 which, as shown in FIG. 8 and FIG. 9, removes impurities such as deep-fried batter balls from the filtering water tank 2a.

The impurity removing device 25 forms a piping flow path separate from the water circulation path 2 so that it can perform an impurity removing operation independently.

The untreated water reservoir 2k and the clean water reservoir 2m in the filtering water tank 2a are connected with a water discharge pipe 21b for impurity removal and a water supply pipe 21a, respectively. In these pipes are installed a piston-driven flow control valve 22 and a solenoid type stop valve 23. The flow control valve 22 is connected on its upstream side to a city water tap (not shown). The filtering water tank 2a may be provided with a water level sensor on an inner wall thereof, as required, so that the flow control valve 22 as a flow regulator can adjust the volume of water being supplied according to a signal from the water level sensor.

On the downstream side of the stop valve 23 is installed an impurity collecting container 24 having a wire basket 24a formed of a 0.7-mm mesh stainless steel wire net that drains impurities such as deep-fried batter balls delivered there by the water flowing out of the front end of the water discharge pipe 21b and which traps and accommodates the drained impurities.

In connection with the installation of the impurity removing device 25, a filtering water path 13g is provided with a solenoid type check valve 13h that prevents a backflow toward the bubble elimination tank 2g of the water that is supplied from the water supply pipe 21a to the filtering water tank 2a. Prior to supplying water from the water supply pipe 21a, the check valve 13h is closed to prevent a possible backflow in the filtering water path 13g.

The flow control valve 22 has a valve structure capable of fully closing the flow path. The flow control valve 22 and the stop valve 23 are also made manually operable so that an impurity removal mode may be started and stopped manually.

As shown in FIG. 9, the water supply pipe 21a has a water supply end pipe 22a extending from a piping joint at the upper end of the clean water reservoir 2m in the filtering water tank 2a to the bottom of the reservoir 2m. The water supply end pipe 22a is formed with an appropriate number of small water supply holes (not shown) between the bottom and the upper end thereof. These small holes are formed such that their diameter is increased as they approach the bottom. Alternatively, if they are formed in the same diameter, the number of small holes is increased toward the bottom.

The water discharge pipe 21b has a water discharge end pipe 22b extending from the upper end of the filtering water tank 2a to the bottom so that a discharge opening of the pipe 21b is disposed close to the bottom of the filtering water tank 2a. In this piping, water discharged at the upper end of the filtering water tank 2a from the water discharge end pipe 22b is delivered through the single water discharge pipe 21b to the impurity collecting container 24.

In this impurity removing device 25, the water supply pipe 21a is connected to a city water tap (not shown) on the upstream side of the flow control valve 22. With the tap open, the stop valve 23 is opened to allow the flow control valve 22 to adjust the water supply volume in the impurity removing operation.

The water discharge pipe 21b can be made to penetrate the bottom of the filtering water tank 2a and connected to the impurity collecting container 24 disposed directly beneath the filtering water tank 2a so that impurities can be discharged out into the container 24. In this case, the filtering water tank can be removed of impurities and washed clean without removing the filtering water tank.

[Impurity Removing Method]

In the fryer 1 of this embodiment with the impurity removing device 25, when, while not frying, the operation mode is switched from the fry mode to the impurity removal mode, the water that has flowed from the water supply pipe 21a into the clean water reservoir 2m of the filtering water tank 2a passes through the filter 2j into the untreated water reservoir 2k. The water then flows from the water discharge end pipe 22b through the water discharge pipe 21b out into the impurity collecting container 24, carrying impurities with it.

During the impurity removal mode, the water level sensor attached to the inner wall surface of the filtering water tank 2a is energized. Since the water supply volume can be adjusted by the flow control valve 22 based on a signal from the water level sensor, the stop valve 23 is opened to let the water coming out of the filtering water tank 2a flow into the impurity collecting container 24 while at the same time adjusting the water flow as required by the removal of impurities.

With the impurities such as deep-fried batter balls trapped in the untreated water reservoir 2k of the filtering water tank 2a removed, the power supply of the impurity removal mode is shut off, the stop valve 23 and the flow control valve 22 are fully closed to stop the water flow, thus ending the impurity removal mode of the fryer.

Then, the impurities such as deep-fried batter balls drained by the wire basket 24a of the impurity collecting container 24 and waste water are discarded as required, completing the impurity removing work.

The replacement of water in the filtering water tank 2a, performed in the same way as the removal of impurities from the filtering water tank 2a, can be effectively utilized also when the water in the fryer tank 1a needs to be replaced as when the water in the water layer 12 of the fryer tank 1a is contaminated or when the water temperature has risen beyond approximately 60° C.

That is, if cool water is supplied directly into the water layer 12 at an elevated temperature, a sudden expansion of water may cause a dangerous situation. To prevent this, the water circulation path is first closed to stop the water circulation and discharge the water from the filtering water tank 2a, after which clean water is filled into the filtering water tank 2a and then water circulation is again started. This allows the clean water to be supplied gradually into the water layer 12. By repeating this procedure as required, the water in the fryer tank 1a can be replaced with clean water.

This water replacement procedure can be performed manually or automatically by sensing the water temperature in the fryer tank 1a.

In the above example, the water supply pipe 21a and the water discharge pipe 21b are connected to the clean water reservoir 2m downstream of the filter and the untreated water reservoir 2k upstream of the filter, respectively. These pipes may also be connected both to the untreated water reservoir 2k upstream of the filter.

The water supply pipe 21a and the water discharge pipe 21b may be connected to locations close to where an impurity mixture water path 13f and a filtering water path 13g of a water circulation system piping 13c connect to the untreated water reservoir 2k and the clean water reservoir 2m, respectively, of the filtering water tank 2a, in order to keep the number of pipes directly connecting to the filtering water tank 2a from increasing. In that case, the pipes connecting to the filtering water tank 2a can be limited only to two pipes—the impurity mixture water path 13f and the filtering water path 13g of the water circulation system piping 13c—facilitating the process of mounting and dismounting the filtering water tank 2a to and from the fryer body.

DESCRIPTION OF SYMBOLS

Figure 1:
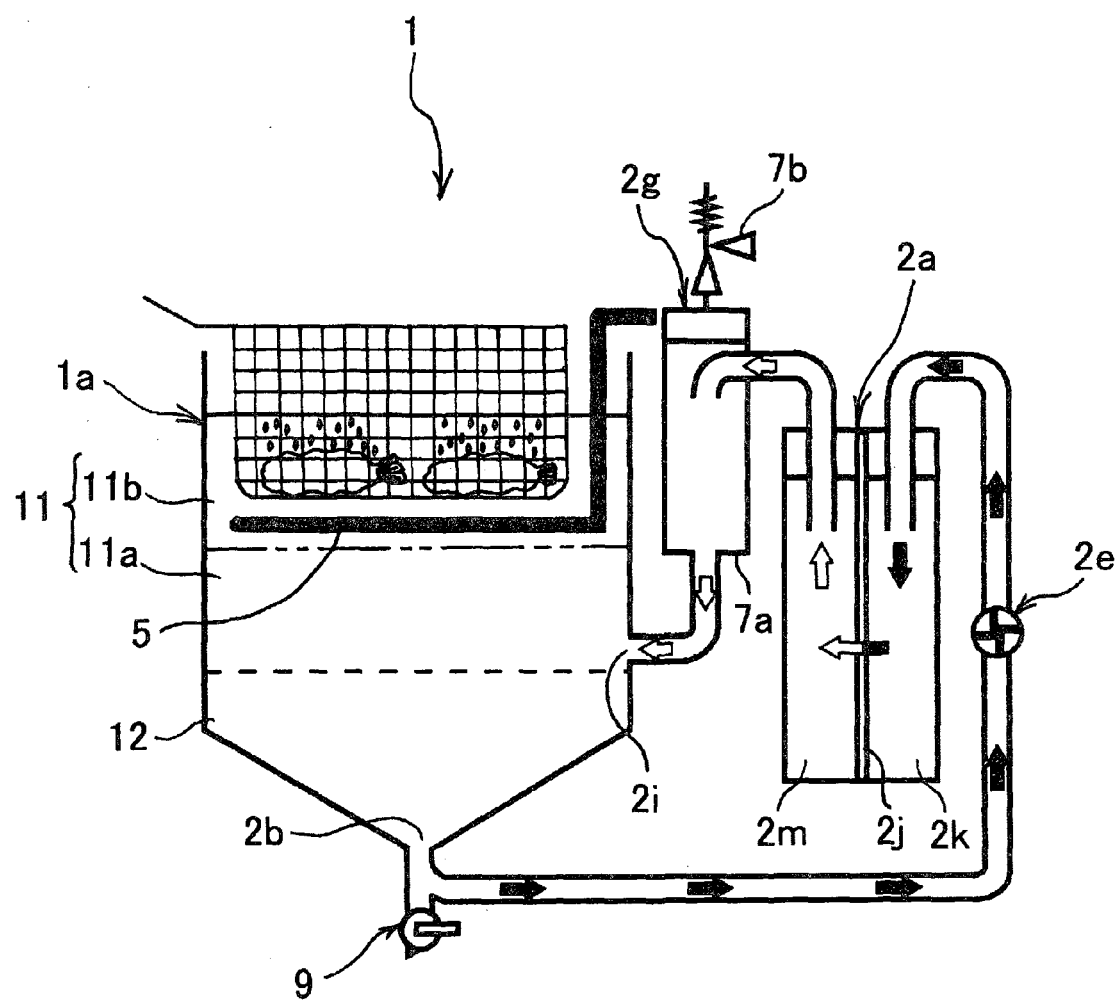
FIG. 1 is a front view schematically showing a fryer as one embodiment of this invention.
Figure 2:
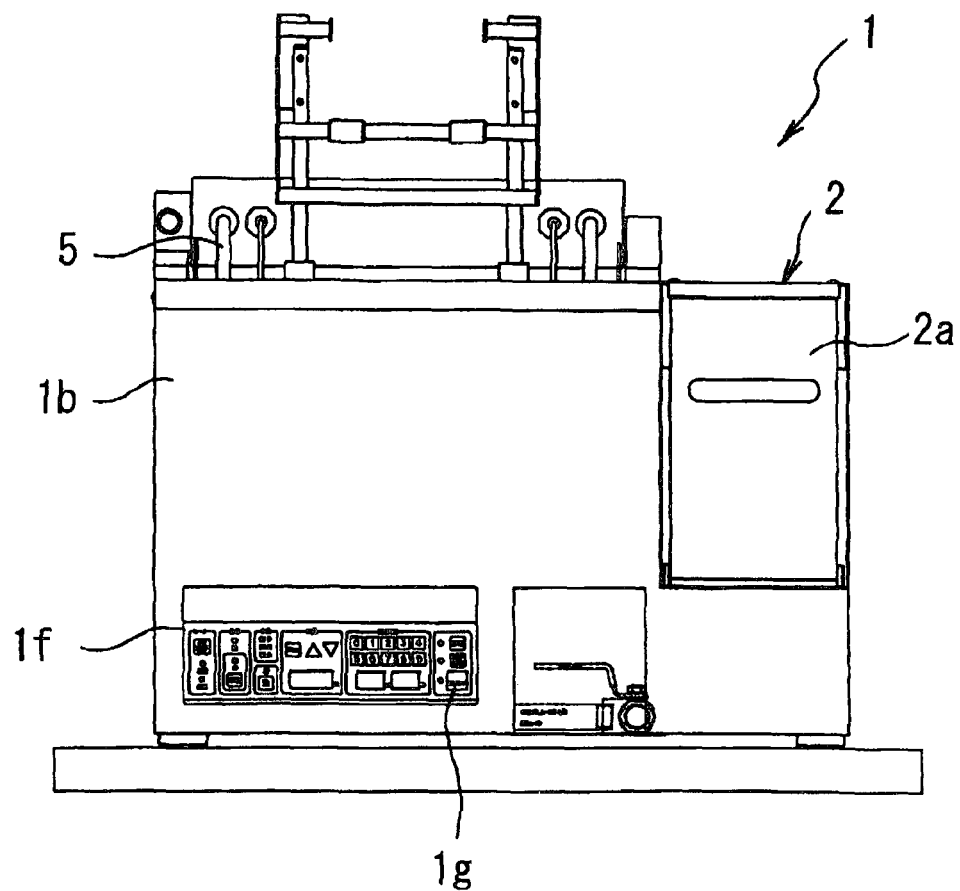
FIG. 2 is a front view of the fryer.
Figure 3:
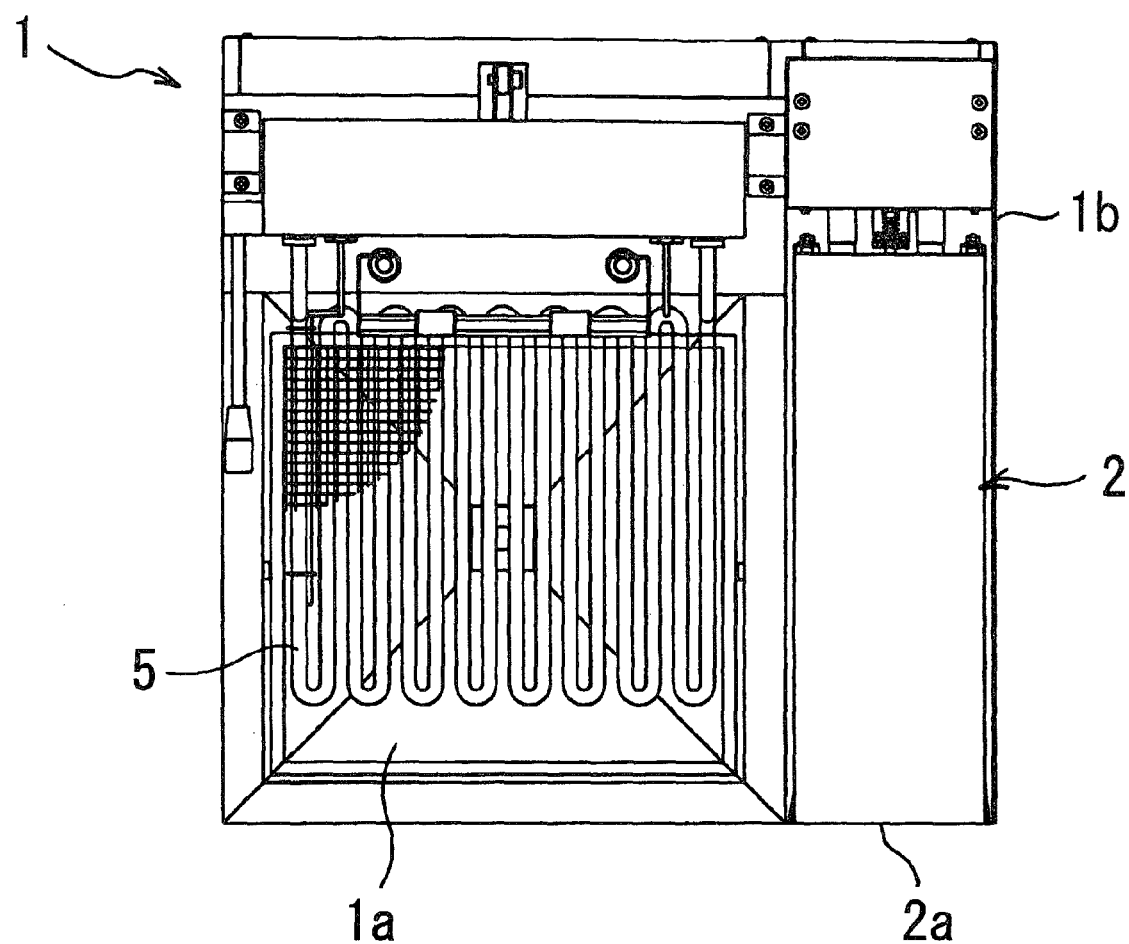
FIG. 3 is a plan view of the fryer.
Figure 4:
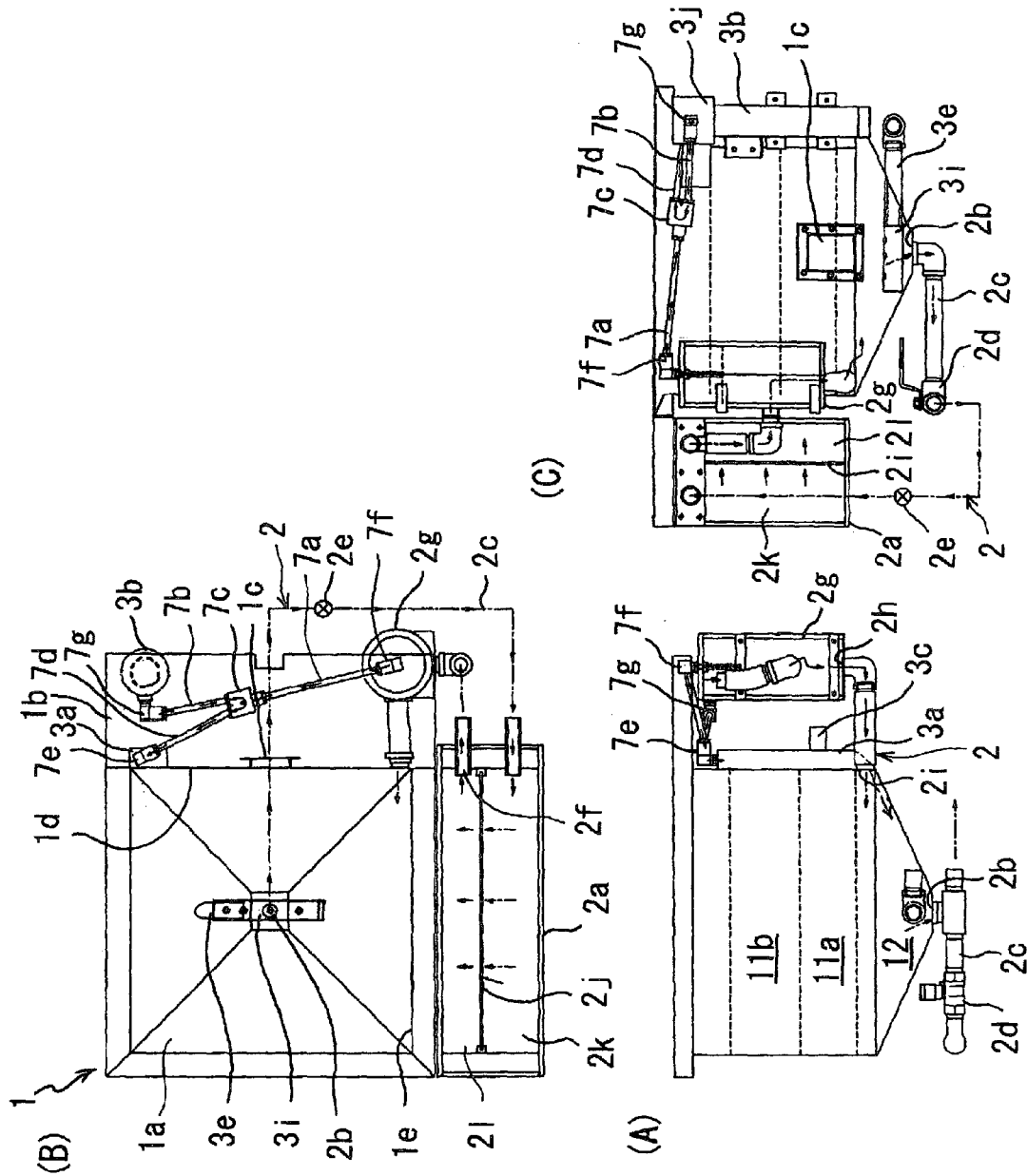
FIG. 4 is a three-view explanatory diagram showing a water circulation path of the fryer with a case removed, (A) being a right-side view, (B) a plan view and (C) a rear view.
Figure 5:
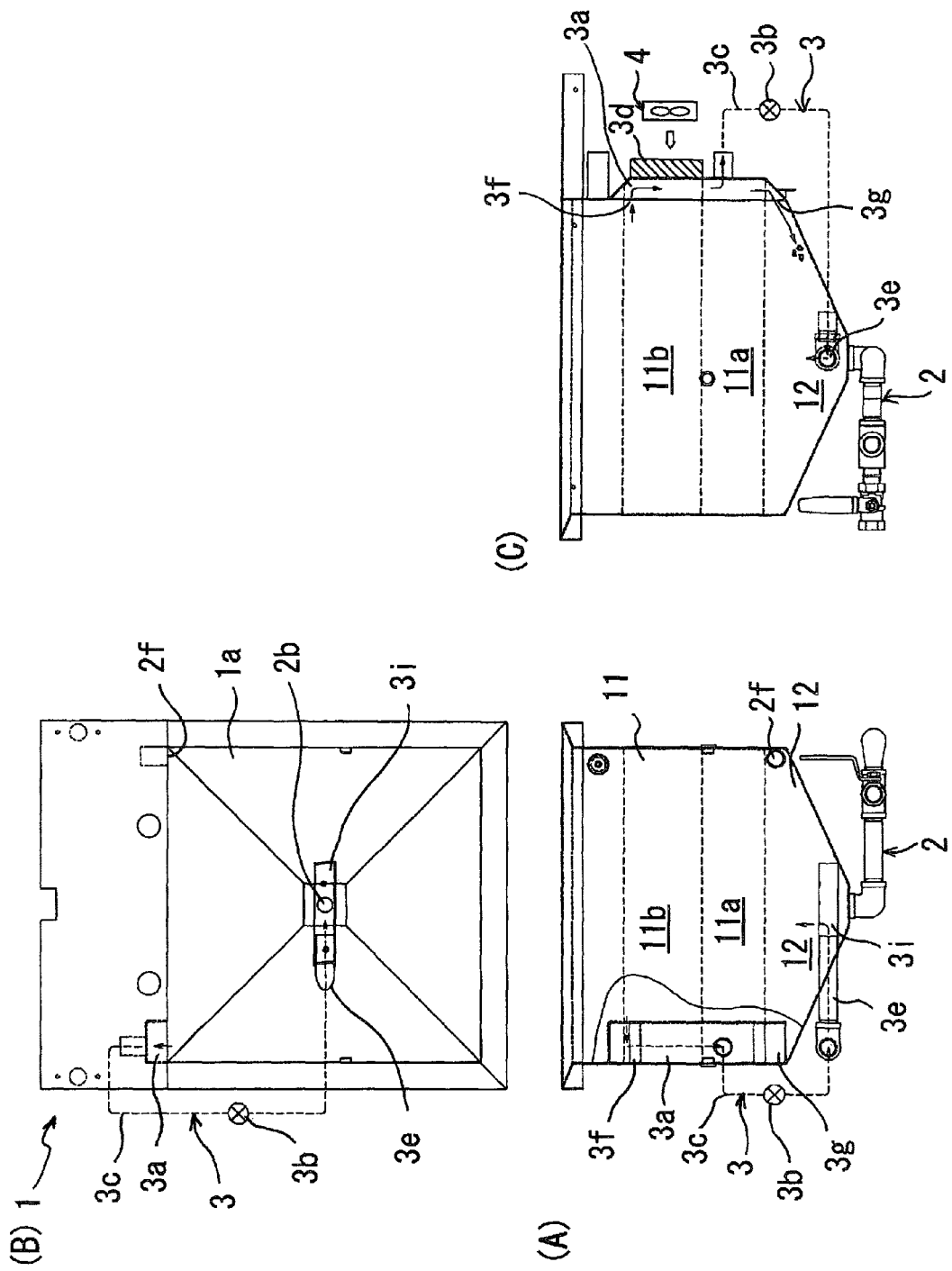
FIG. 5 is a three-view explanatory diagram showing an oil circulation path of the fryer with the case removed, (A) being a front view, (B) a plan view and (C) a right-side view.
Figure 6:
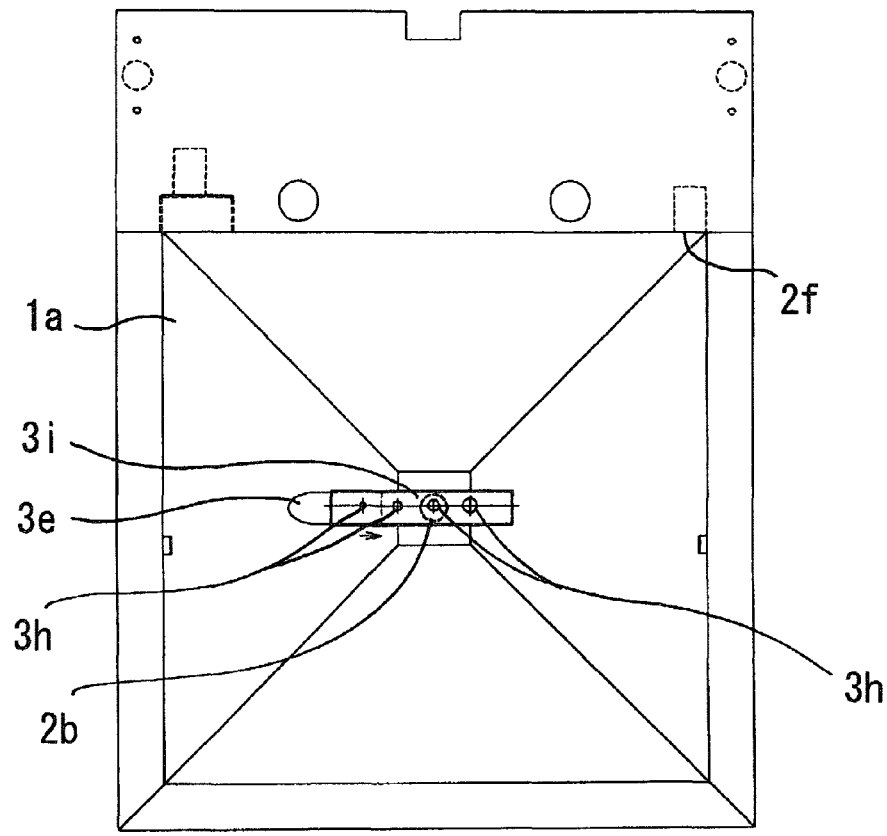
FIG. 6 is an explanatory magnified view of an oil release member 3i secured to an oil discharge nozzle 3e arranged in the fryer tank, (A) being a front view and (B) a plan view.
Figure 6:
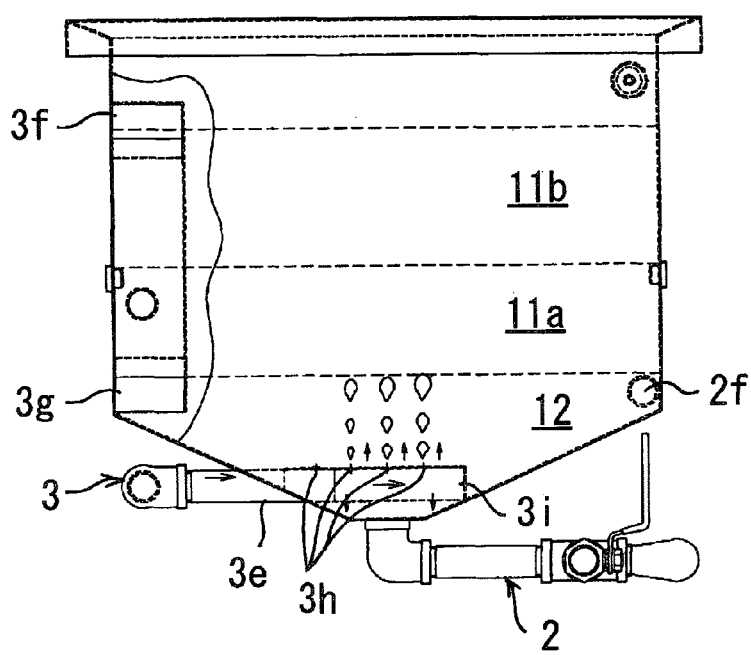
Figure 7:
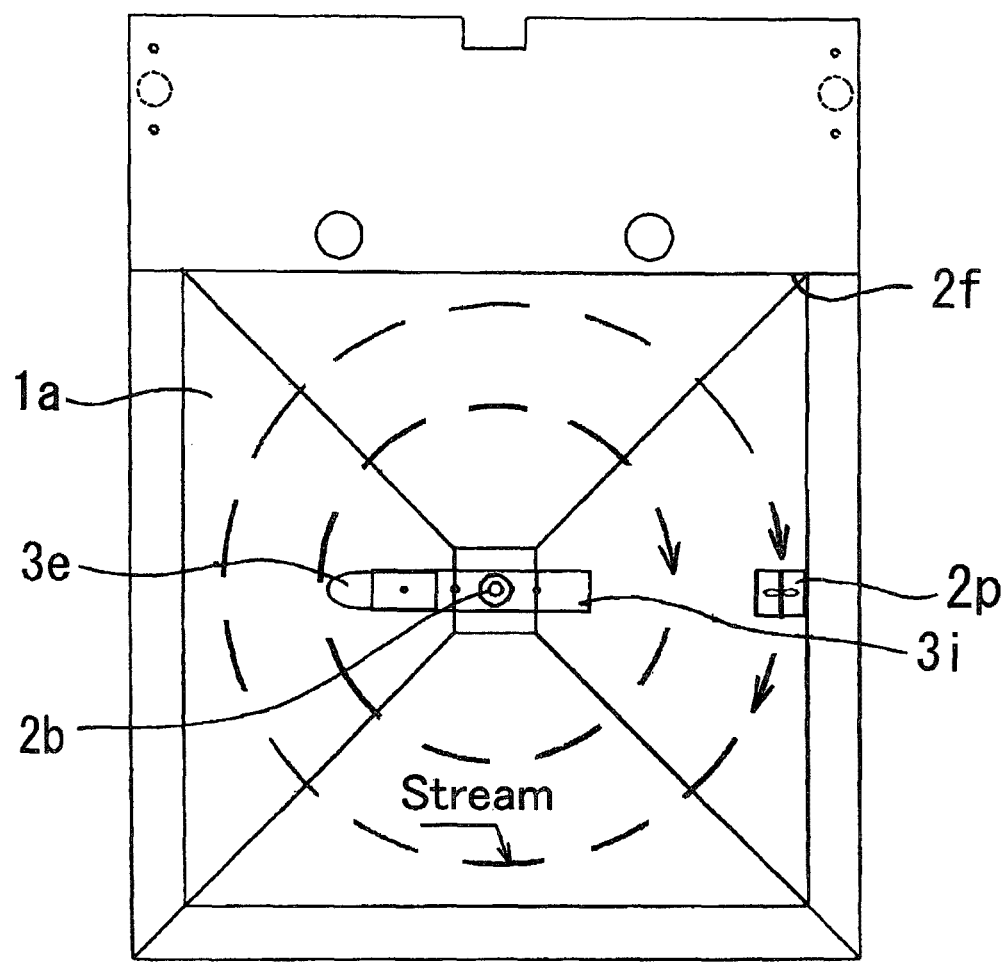
FIG. 7 is an explanatory plan view of the fryer tank showing how a swirl is produced by a pump installed in the fryer tank.
Figure 8:
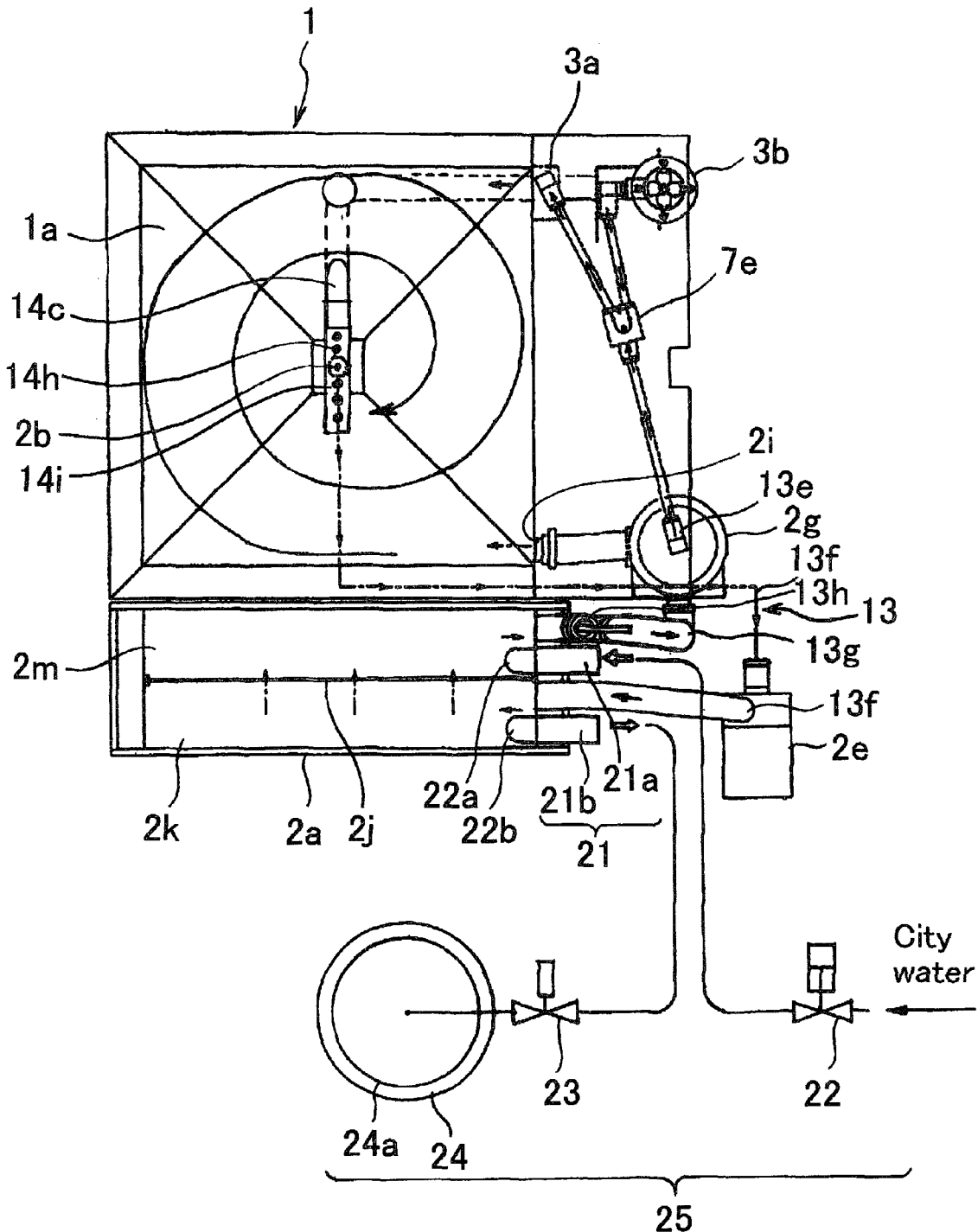
FIG. 8 is an explanatory plan view showing how a water circulation system of the filtering water tank of the fryer is connected to an impurity removing device through piping.
Figure 9:
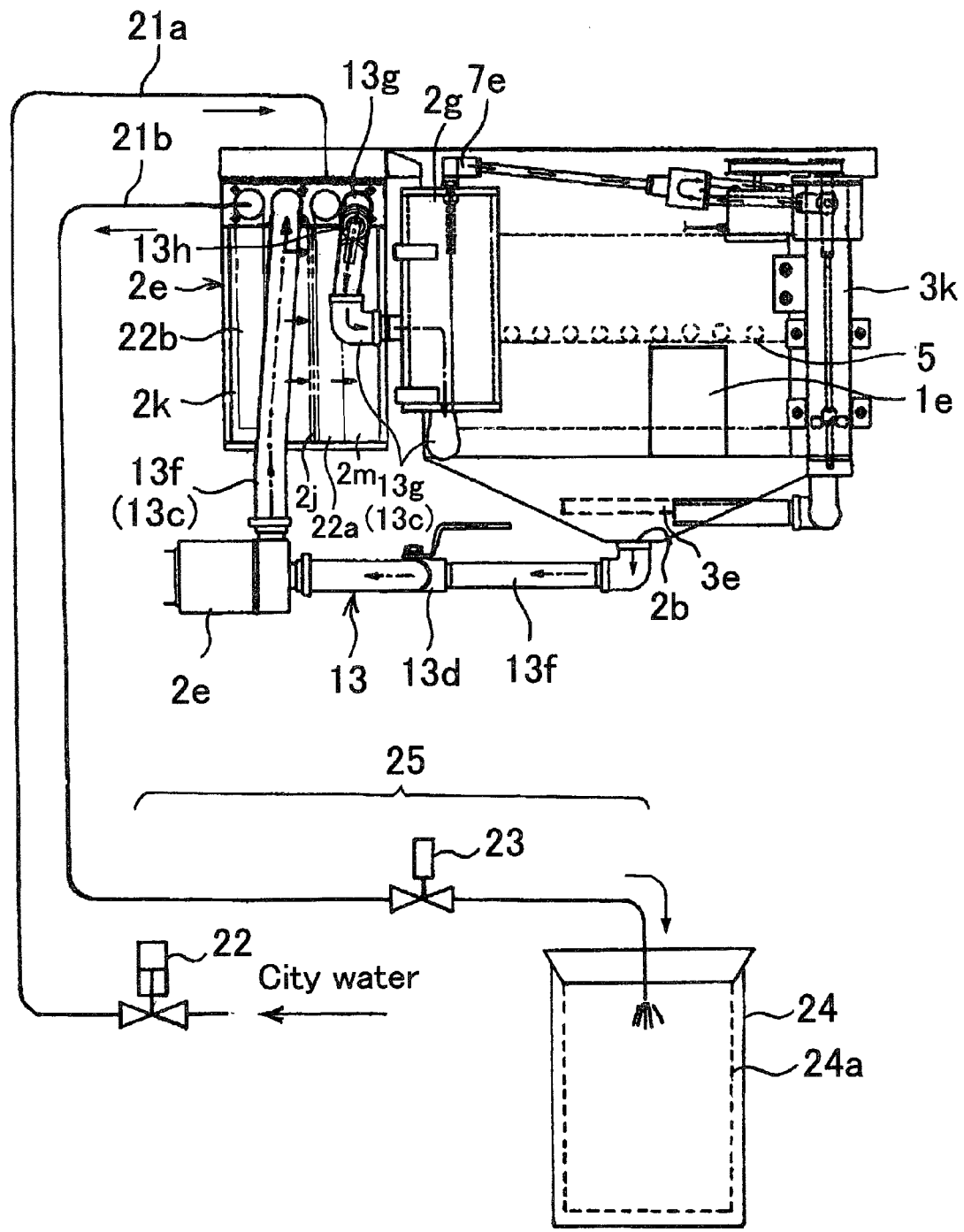
FIG. 9 is an explanatory rear view showing how a water circulation system of the filtering water tank of the fryer is connected to an impurity removing device through piping.

1 Fryer
1a Fryer tank
1c Water level sensor
2 Water circulation path
2a Filtering water tank
2g Bubble elimination tank
2j Filter
2k Untreated water reservoir
2m Clean water reservoir
3e Oil discharge nozzle
11a Low-temperature oil portion
11b High-temperature oil portion
12 Water layer
21a Water supply pipe
21b Water discharge pipe
22 Flow control valve
23 Stop valve
24 Impurity collecting container
25 Impurity removing device

The invention claimed is:

1. A fryer, comprising:

a fryer tank having an oil layer for cooking and a water layer disposed below the oil layer;

a heater disposed in the oil layer;

a water suction opening at a bottom of the fryer tank, the water suction opening being disposed at an intersection point between a first line, which connects center points of two opposite side walls among side walls of said fryer tank, and a second line, which connects center points of two other opposite side walls among said side walls of said fryer tank, in top view; and a water supply opening formed in one of said side walls of the fryer tank and opening to the water layer, said water supply opening being disposed at a side end part of one of said side walls near a corner of said fryer tank, in top view, said water supply opening discharging water at least in a direction perpendicular to said side wall in which said water supply opening is formed, wherein in plan view, said water supply opening is off-center relative to said water suction opening, wherein water in the water layer is circulated through a water recirculation path disposed between said water suction opening and said water supply opening by being drawn out from said water suction opening and then outputted from said water supply opening into the fryer tank, thus rotating the water layer in the fryer tank in a swirl, the swirl in the water causing the oil in contact with the water to revolve horizontally, wherein said water recirculation path comprises a filtering water tank having a filter;

wherein water in the water layer mixed with impurities is drawn out from said water suction opening and then delivered into the filtering water tank where the impurities are filtered out and allowed to settle on a bottom of the filtering water tank; and wherein the filtered water is delivered into the fryer tank from said water supply opening.

2. The fryer according to claim 1, further comprising a water level sensor arranged to vertically span a boundary between the oil and water layers in the fryer tank to monitor a change in water level.

3. The fryer according to claim 1, further comprising a bubble elimination tank installed in a water path running from the filtering water tank to the water layer;

wherein the bubble elimination tank separates water and air by accommodating water and accumulating water in a lower part thereof and air in an upper part thereof; and wherein the bubble elimination tank has an inner pressure adjusting means at an upper end portion thereof to vent the air accumulated in the upper part of the bubble elimination tank to the outside.

4. The fryer according to claim 1, wherein said water supply opening is disposed such that water is discharged along an adjoining side wall which adjoins said one of said side walls in which said water supply opening is formed.

* * * * *